United States Patent
Ayoub

(10) Patent No.: US 6,786,596 B1
(45) Date of Patent: Sep. 7, 2004

(54) OPTICAL LENS COATING

(76) Inventor: Abby Ayoub, 1413 28th St., North Bergen, NJ (US) 07047

( * ) Notice: Subject to any disclaimer, the term of this patent is extended or adjusted under 35 U.S.C. 154(b) by 0 days.

(21) Appl. No.: 09/621,223

(22) Filed: Jul. 21, 2000

(51) Int. Cl.[7] .................................................. G02C 7/02
(52) U.S. Cl. ...................................... 351/159; 351/177
(58) Field of Search ................................ 351/158–159, 351/162–163, 166, 177, 41, 44–45

(56) References Cited

U.S. PATENT DOCUMENTS

| | | | |
|---|---|---|---|
| 2,354,772 A | | 8/1944 | Prange ........................... 41/21 |
| 3,880,631 A | * | 4/1975 | Ripley ............................. 65/30 |
| 4,045,138 A | | 8/1977 | Kunde et al. ................. 351/178 |
| 4,076,863 A | * | 2/1978 | Onoki et al. ................. 427/165 |
| 4,338,003 A | | 7/1982 | Adrian ......................... 351/45 |
| 4,547,397 A | * | 10/1985 | Burzynski et al. ........... 427/164 |
| 4,733,959 A | * | 3/1988 | Claussen et al. ............. 351/177 |
| 4,812,031 A | | 3/1989 | Evans .......................... 351/46 |
| 4,919,663 A | * | 4/1990 | Grendahl .................... 623/6.28 |
| 4,931,523 A | * | 6/1990 | Watanabe et al. ......... 526/292.3 |
| 4,955,709 A | | 9/1990 | Smith ........................... 351/46 |
| 5,220,358 A | * | 6/1993 | Brown et al. ................ 351/159 |
| 5,288,533 A | | 2/1994 | Remick, II ................... 428/45 |
| 5,428,409 A | | 6/1995 | Silverstein ................... 351/45 |
| 5,502,516 A | | 3/1996 | Elterman ..................... 351/47 |
| 5,520,568 A | | 5/1996 | Craighead et al. ............ 451/42 |
| 5,617,153 A | | 4/1997 | Allen et al. .................... 351/45 |
| 5,631,717 A | | 5/1997 | Spector ........................ 351/44 |
| 5,767,933 A | | 6/1998 | Hagan .......................... 351/52 |
| 5,846,649 A | | 12/1998 | Knapp et al. ................ 428/334 |
| 6,027,816 A | * | 2/2000 | Ono et al. ................... 428/447 |
| 6,216,360 B1 | * | 4/2001 | Wertheim ..................... 34/266 |
| 2003/0075816 A1 | * | 4/2003 | Buazza ....................... 264/1.36 |

OTHER PUBLICATIONS

Safety Data Sheet for Aurochim SRL, dated May 1, 2000, printed on Nov. 6, 2002.
Fax from Ted Rzemien of Hilco to Michael Hoff/Hoff & Hoff, dated Jun. 27, 1997 re: Aurolens®/Aurochim.
Article "NACL Coating Process Masks Thickness," Vision Monday, The Optical Industry Newspaper, Jun. 24, 1991, p. 17.

* cited by examiner

*Primary Examiner*—Jordan M. Schwartz
(74) *Attorney, Agent, or Firm*—Greenberg Traurig, LLP; Adam B. Landa; Richard E. Kurtz, II

(57) ABSTRACT

An optical lens having a colored coating affixed to the edge of the lens. The apparatus may enhance the cosmetic appearance of eyeglasses by reducing the appearance of the white ring appearing along the perimeter of the face of lens when viewing eyeglasses from the front, and by reducing the appearance of the white film on the edge of lenses when viewing eyeglasses from the side. The apparatus may also reduce the glare of the optical lens from light entering through the edge of the lens.

10 Claims, 2 Drawing Sheets

110 = Lens Edge
120 = Lens Face
210 = Frame
220 = White Ring

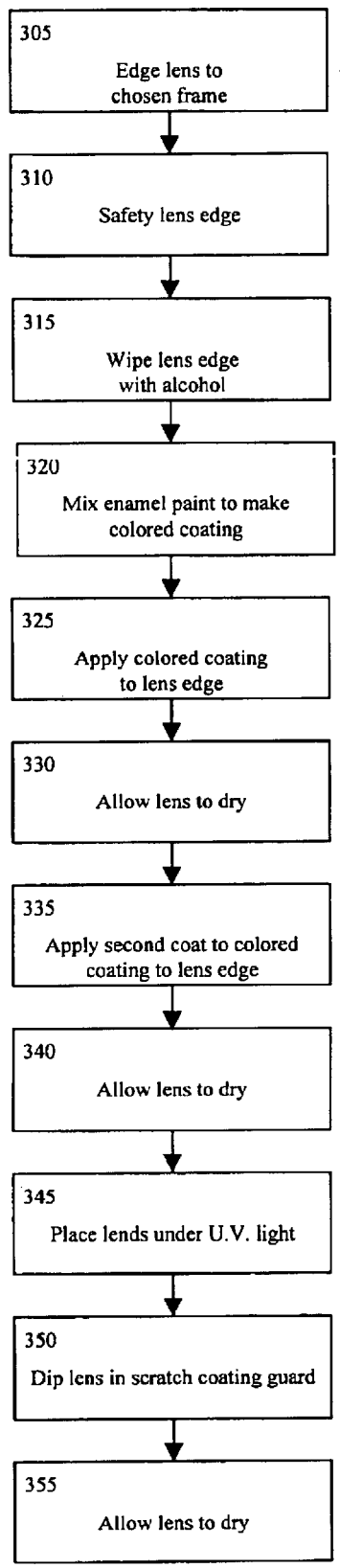

OPTICAL LENS COATING

FIELD OF THE INVENTION

The invention relates to optical lens coatings, in particular the application of a coating to an optical lens used in eyeglasses.

BACKGROUND

Eyeglass lenses set in frames have aesthetic problems. Often the lens is thicker than the frame, and the edge of the lens has a noticeable white film. Viewing eyeglasses from the side, the edge of the lens can extend beyond the edge of the frame, thus making the eyeglasses less cosmetically appealing because the white filmy edge contrasts with the color of the frame.

One solution is to polish the edge of the lens to eliminate the white film. Polishing is often used with rimless frames. However, polishing the edge of a lens used in a frame other than a rimless frame can make the edge of the lens stand out even more. Further, polishing the edge of the lens can allow more light to enter the lens from the side, thereby increasing the glare to the wearer's eye.

SUMMARY

It would be desirable to have a technique to enhance the cosmetic appearance of eyeglasses by reducing the appearance of the white film on the edge of an optical lens and reducing the appearance of the white ring appearing along the perimeter of the face of an optical lens.

By applying a colored coating to the edge of an optical lens, the cosmetic appearance of eyeglasses may be enhanced by reducing the appearance of the white film on the edge of an optical lens and by reducing the appearance of the white ring along the perimeter of the face of an optical lens, and the glare of the optical lens produced by light entering through the edge of the lens may be reduced.

It is to be understood that both the foregoing general description and the following detailed description are exemplary and explanatory and are intended to provide further explanation to of the invention as claimed.

BRIEF DESCRIPTION OF THE DRAWINGS

FIG. 3 is a flow chart illustrating a method by which a coating may be applied to a lens.

DETAILED DESCRIPTION

Many people with strong eyeglass prescriptions avoid wearing glasses because their lenses are thicker than the frame in which the lenses sit. Such lenses are quite noticeable because the white film that appears on the edge of the lens contrasts with the color of the eyeglass frame. One embodiment of the invention is directed to enhancing the cosmetic appearance of eyeglasses by reducing the appearance of this white film that appears on the edge of the lens applying a colored coating to the edge of the lens, the colored coating matching the color of the frame into which the lens will sit.

The fashion industry has avoided using eyeglasses in photo shoots because of reflections in the lenses. When a particular photo requires the model to wear glasses, the lenses of the frames are traditionally removed for a number of reasons. One reason the fashion industry removes the lenses due to the glare from light reflecting off the surface of the lens. Anti-glare coating can reduce the amount of the light that reflects off the surface of the lens. However, there is also a white ring that appears along the perimeter of the face of the lens due to light entering through the edge of the lens. The edge of the lens allows light to pass through it which creates the appearance of the white ring around the perimeter of the face of the lens. This ring appearing along the perimeter of the lens face is visible to both the eyeglass wearer and others.

In a first embodiment, an opaque colored coating is applied to the edge of the lens to reduce the amount of light passing through the edge of the lens, thereby reducing the appearance of the white ring otherwise appearing along the perimeter of the lens face.

In a second embodiment, a translucent colored coating is applied to the edge of the lens to allow some light to pass through, giving the lens a colored hue while still achieving the beneficial results.

In a third embodiment, a colored coating is chosen that contrasts with the color of the frame, giving the eyeglass wearer an additional fashion choice yet still providing the benefits of reducing the appearance of the white ring appearing along the perimeter of the lens face.

Figure 1:
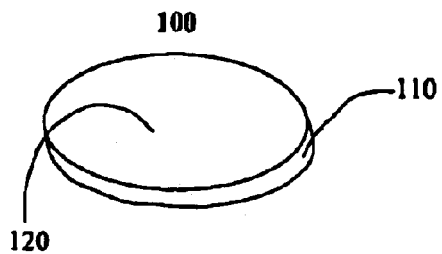
FIG. 1 is a three-dimensional drawing of an eyeglass lens.

The first embodiment will now be discussed with reference to FIGS. 1, 2a and 2b. This embodiment addresses the problems caused by the white film on the edge of the lens. FIG. 1 is a three-dimensional drawing of eyeglass lens 100 having edge 110 and face 120.

Figure 2A:
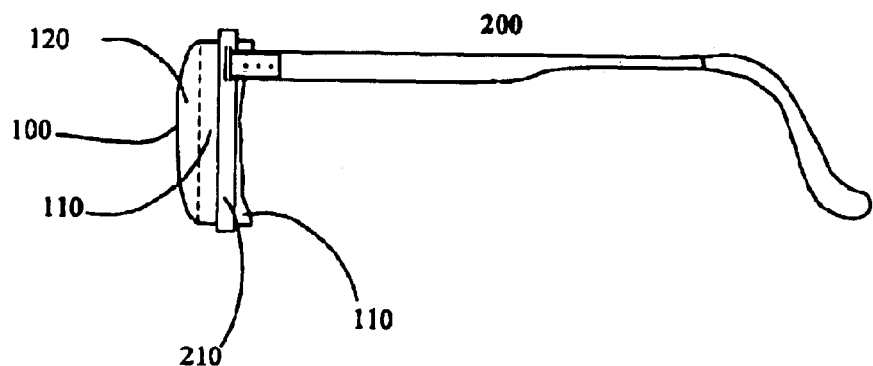
FIG. 2a is a side view of eyeglasses having a lens in a frame.

FIG. 2a is a side view of eyeglasses 200 having lens 100 sitting in frame 210. Lens 100 is shown with edge 110 and face 120. Lens 100 is thicker than frame 210, as shown by lens edge 110 extending beyond the borders of frame 210. In one embodiment, a colored coating is applied to lens edge 110. The color of the coating matches the color of frame 210 into which lens 100 will be inserted. By coloring edge 110 of lens 100 to match the color of frame 210, lens edge 110 cosmetically blends in with frame 210 making lens edge 110 much less noticeable from the side.

Figure 2B:
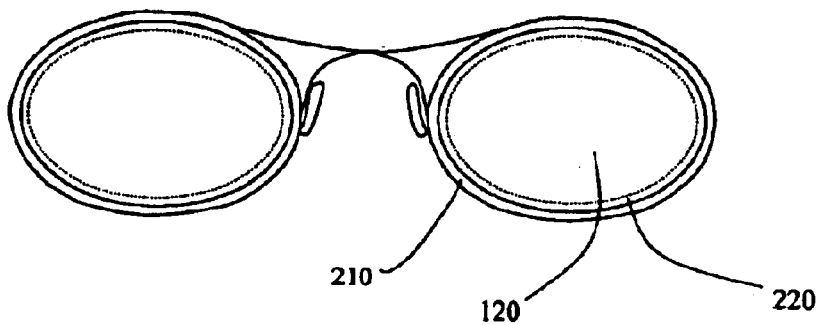
FIG. 2b is a front view of eyeglasses.

FIG. 2b is a front view of eyeglasses 200. Frame 210 has a lens having face 120. White ring 220 on lens face 120 encircles the perimeter of lens face 120 when light passes through lens edge 110 (shown in FIG. 2a). In this embodiment, applying an opaque coating to lens edge 110 (shown in FIG. 2a) blocks light from entering through lens edge 110, which reduces or eliminates the appearance of white ring 220 on lens face 120. Cosmetically, lens face 120 now appears to extend all the way to frame 210 without the appearance of white ring 220 running along the perimeter of lens face 120.

The second embodiment will now be described with reference to FIGS. 1, 2a and 2b. In this embodiment, an opaque colored coating is applied to lens edge 110 that does not match the color of frame 210. This unmatched color enables lens edge 110 to cosmetically contrast with the color of frame 210. The contrasting opaque colored coating in this embodiment still blocks light from entering lens edge 110 thereby reducing the appearance of white ring 220.

The third embodiment will now be described with reference to FIGS. 1, 2a and 2b. In this embodiment, a translucent colored coating is applied to lens edge 110. Such a translucent color allows some light to enter lens 100 through lens edge 110. When lens 100 having a translucent colored coating on lens edge 110 is place in frame 200 and viewed from the front of glasses 200, lens face 120 takes on the hue of the translucent colored coating.

One embodiment of the colored coating comprises a commercially available acrylic enamel paint or a commercially available fingernail enamel. The color of the coating may be custom mixed to match each frame style and color. Alternatively, the color can be chosen by the customer, as-can whether the coating will be opaque or translucent. Optical lens scratch-coating can optionally be added to the colored coating mix which adds strength to the coating.

In an alternate embodiment, the color of the coating is matched to the color of the frame using a color matching computer system which determines the amounts of different paints to mix together to match the color of a frame placed under its sensor.

One embodiment of a method of applying the coating to a lens will now be described with reference to FIG. 3. First, the lens is "edged" to the chosen frame, meaning it is cut to fit a particular frame (Step 305). Next, the lens is "saftied", meaning the sharp edge of the lens is removed so it doesn't pose a hazard to the wearer (Step 310). The lens is then wiped down with alcohol to ensure it is clean (Step 315). Enamel paint is then mixed to create the desired color of the coating (Step 320). The colored coating is then applied to the lens edge 110 using a paint brush or other paint applicator (Step 325). The lens is then allowed to dry (Step 330). An optional second coat of the colored coating is then applied to lens edge 110, and the lens is again allowed to dry (Steps 235 and 240). Any excess colored coating that may have spilled on to face 120 of the lens is removed using commercially available paint thinner which may be acetone-based or non-acetone-based. The lens is then placed under an ultraviolet light to help the colored coating to dry (Step 245). Alternatively, the lens may be placed in a hot air blower or a frame warmer. The lens is then dipped in scratch-guard coating to help prevent the colored coating from chipping (Step 250). Alternatively, the scratch-guard coating may be added to the colored coating when the colored coating is mixed in Step 220. Finally, the lens is again allowed to dry (Step 255).

It is to be understood that that the embodiments do not require applying the colored coating to the entire edge of an optical lens. For example, with reference to eyeglasses 200 in FIG. 2a in an alternate embodiment, the colored coating is applied only to that portion of edge 110 of lens 100 not covered by frame 210.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended means each and their equivalents. In this context, equivalents means each and every implementation for carrying out the functions recited in the claims, even if not explicitly described herein.

I claim:

1. An apparatus, comprising:

an optical lens for use in eyeglasses, said lens having an edge;

a color coating affixed to at least a portion of only the edge of the lens, said colored coating being effective to reduce the appearance of a white ring along the perimeter of the face of said lens, wherein said colored coating is translucent.

2. The apparatus of claim 1, further comprising a scratch-guard coating.

3. The apparatus of claim 1 further comprising an eyeglass frame having a color wherein the lens is affixed to the eyeglass frame.

4. The apparatus of claim 3 wherein the color of the colored coating matches the color of the eyeglass frame.

5. The apparatus of claim 3 wherein the color of the colored coating does not match the color of the eyeglass frame.

6. A method of applying a colored coating to an optical lens for use in eyeglasses, said lens having an edge, comprising applying the colored coating to at least a portion of the edge of the lens such that the colored coating is affixed only to the edge of the lens, said colored coating being effective to reduce the appearance of a white ring along the perimeter of the face of said lens; and placing the lens under a heat source after the application of the colored coating, wherein the heat source is an ultraviolet light.

7. The method of claim 6 further comprising:

removing any excess colored coating from the face of the lens.

8. The method of claim 6 further comprising:

applying a scratch-guard coating to the lens.

9. The method of claim 6 wherein the colored coating matched the color of an optical frame for the lens.

10. The method of claim 6 further comprising allowing the colored coating to dry before placing the lens under the heat source.

* * * * *